United States Patent
Grassi

(10) Patent No.: US 9,061,861 B2
(45) Date of Patent: Jun. 23, 2015

(54) APPARATUS FOR GUIDING A FLEXIBLE MEMBER

(75) Inventor: Michele Grassi, Pisa (IT)

(73) Assignee: Mathclick Limited, London (GB)

(*) Notice: Subject to any disclaimer, the term of this patent is extended or adjusted under 35 U.S.C. 154(b) by 127 days.

(21) Appl. No.: 13/876,741

(22) PCT Filed: Sep. 29, 2011

(86) PCT No.: PCT/GB2011/001418
§ 371 (c)(1),
(2), (4) Date: Mar. 28, 2013

(87) PCT Pub. No.: WO2012/042216
PCT Pub. Date: Apr. 5, 2012

(65) Prior Publication Data
US 2013/0193689 A1    Aug. 1, 2013

(30) Foreign Application Priority Data
Sep. 29, 2010    (GB) .................................. 1016388.9

(51) Int. Cl.
*F03B 13/10*    (2006.01)
*F03B 13/12*    (2006.01)
(Continued)

(52) U.S. Cl.
CPC .............. *B65H 57/14* (2013.01); *B66D 1/7405* (2013.01); *F16H 7/04* (2013.01); *Y02E 10/38* (2013.01); *B66D 1/36* (2013.01); *F03B 13/14* (2013.01)

(58) Field of Classification Search
CPC .......... B65H 57/14; F03B 13/14; B66D 1/36; B66D 1/7405; Y02E 10/38; F16H 7/04
USPC ......... 290/53, 43, 42, 54; 242/615.2; 254/334
See application file for complete search history.

(56) References Cited

U.S. PATENT DOCUMENTS

| 2,859,629 A | 11/1958 | Parker et al. |
| 3,403,474 A | 10/1968 | Spasoff |

(Continued)

FOREIGN PATENT DOCUMENTS

| DE | 59 453 C | 10/1891 |
| DE | 63 352 C | 7/1892 |

(Continued)

OTHER PUBLICATIONS

PCT/GB2011/001418 International Search Report mailed Feb. 16, 2012.

(Continued)

*Primary Examiner* — Javaid Nasri
(74) *Attorney, Agent, or Firm* — Wood, Herron & Evans, L.L.P.

(57) ABSTRACT

An apparatus (1) for guiding a flexible member (6) comprising a drum (4) mounted for rotation about a drum axis (5) and a pulley (2) mounted for rotation about a pulley axis (3), the drum and pulley axes being inclined. The apparatus defines a path for the flexible member including first and second drum wrap portions (7,9) on axially spaced first and second fixed drum diametric planes, a pulley wrap portion (8) on a fixed pulley diametric plane, and first and second connecting portions (7a, 7b). The arrangement is such that the connecting portions (7a, 7b) lie on the respective first and second drum diametric planes and both lie on the pulley diametric plane. As the drum (4) and pulley (2) rotate with the flexible member (6) in use, the arrangement is such that the first and second drum wrap portions (7,9) remain on the fixed drum diametric planes and the pulley portion of wrap (8) remains on the fixed diametrical plane of the pulley. The apparatus reduces slippage of the flexible member (6) and associated wear.

19 Claims, 6 Drawing Sheets

(51) Int. Cl.
*H02P 9/04* (2006.01)
*B65H 57/14* (2006.01)
*B66D 1/74* (2006.01)
*F16H 7/04* (2006.01)
*B66D 1/36* (2006.01)
*F03B 13/14* (2006.01)

(56) References Cited

U.S. PATENT DOCUMENTS

| | | | |
|---|---|---|---|
| 3,491,603 A | 1/1970 | Harris | |
| 3,804,370 A | 4/1974 | Woodard | |
| 4,351,197 A | 9/1982 | Carson | |
| 4,526,050 A | 7/1985 | Johnson | |
| 4,757,723 A | 7/1988 | Carson | |
| 4,787,259 A | 11/1988 | Carson | |
| 4,796,478 A | 1/1989 | Carson | |
| 4,957,014 A | 9/1990 | Burke | |
| 5,102,373 A | 4/1992 | Martinson et al. | |
| 5,105,672 A | 4/1992 | Carson et al. | |
| 5,562,556 A | 10/1996 | Carson | |
| 6,327,994 B1 * | 12/2001 | Labrador | 114/382 |
| 7,134,645 B1 | 11/2006 | Johnson et al. | |
| 2007/0272141 A1 | 11/2007 | Wrage | |
| 2010/0051890 A1 | 3/2010 | Lauder et al. | |
| 2010/0059620 A1 | 3/2010 | Crawford | |
| 2010/0064679 A1 | 3/2010 | Straume | |
| 2010/0084868 A1 | 4/2010 | Shin | |

FOREIGN PATENT DOCUMENTS

| | | |
|---|---|---|
| DE | 442 387 C | 3/1927 |
| DE | 2447486 C2 | 1/1984 |
| DE | 10117077 C1 | 4/2002 |
| DE | 10322335 A1 | 12/2004 |
| FR | 698 128 A | 1/1931 |
| FR | 1 553 303 A | 1/1969 |
| GB | 345 106 A | 3/1931 |
| GB | 1204771 A | 9/1970 |
| WO | 2008046874 A1 | 4/2008 |
| WO | 2008065684 A1 | 6/2008 |

OTHER PUBLICATIONS

GB1016388.9 Search Report mailed Jan. 20, 2011.

* cited by examiner

APPARATUS FOR GUIDING A FLEXIBLE MEMBER

FIELD OF THE INVENTION

This invention relates to an apparatus for guiding a flexible member. This invention also relates to a winch comprising the apparatus.

The apparatus of the invention may be used to guide one or more flexible members onto one or more drums and to maintain fixed positions of portions of wrap of the one or more flexible members on the surface of the one or more drums.

BACKGROUND TO THE PRESENT INVENTION

Winches, for example car or sailboat winches, are known in which a length of cable is attached at one end to a drum and an end of the cable can be unwound from and rewound onto the drum. Manual effort, or an automated cable feeding device, is typically required to guide the cable onto the drum. The cable is moved along the surface of the drum as it is wound in order to form adjacent coils on the surface of the drum and the cable is typically laid over itself in layers.

As the drum rotates, the coils move in space as if they were moving along a spiral. The drum is therefore required to have sufficient axial length to accommodate this movement of the cable. As an alternative to, or in conjunction with, increasing the axial dimension of the drum, it is known to allow the cable to be laid over itself, in effect increasing the axial length of the drum available to receive the cable. However, winches of this known type cannot be used in applications in which the total length of the line is greater than that which can be accommodated by the drum.

A further problem of such known winches is that the coils in an upper layer of cable can become embedded into the gaps between the coils of a lower layer of cable. This causes friction between the layers resulting in wear of the cable. It also impedes smooth operation and limits the load rating of the winch. Coiling the cable onto the drum also typically involves slippage (in some cases deliberate) of the cable across the drum surface or an underlying layer of cable. This results in frictional wear of the cable, mechanical shock to the system and noise. In deepwater winching applications (e.g. ocean bottom perforation or pipe laying applications) where the system is partially dry and partially wet due to components of the system being above and below the water line, variations in the co-efficient of friction of the cable relative to the drum make slippage even more undesirable.

In use of known winches in which the coils of cable are laid adjacent one another on the drum and laid over each other in layers, the required length of the drum is dictated in part by the length of cable to be unwound from and wound onto the drum. There is often a need to find a balance between the length of cable required for a particular application and the associated physical size of the winch. Known winches are also not optimally designed for heavy load, deepwater applications such as marine deep water operations which can require very long runs of cable (e.g. 4000 metres) for which a drum hundreds of metres long would be required to receive the cable. A known way to improve marine systems is to segment the cable and raise and lower it in sections but this method is complicated and unsuitable for high load applications.

US patent publication no. US2010/0059620 to Crawford provides an improved winch in which the drum has a complex shaped surface and the cable is wound onto the drum by a spooling head so that radially adjacent layers of flexible member are laid such that they are non-parallel to one another. This is intended to reduce interference between layers of spooled cable and lead to smoother operation. However, this is a complicated device having a limited load rating and requiring a slidable spooling head to change the position of the flexible member on the drum. It also requires superposition of coils of cable which are likely to interfere with one another and cause unwanted cable wear.

U.S. Pat. No. 4,351,197 to Carson provides a precision positioning apparatus having a driving element in the form of a rotary lead screw and a driven element in the form of a rotary drum. The lead screw is driven by a motor and moves axially relative to the drum in order that the portion of wraps of the cable on the drum remain in axially fixed positions as the lead screw rotates the drum. This is achieved by a complicated, delicate and inefficient mechanism that permits only limited rotation of the drum in either direction, making it unsuitable for applications involving a high load or long runs of cable.

U.S. Pat. No. 5,105,672 to Carson et al. also provides a rotary drive apparatus comprising a screw element driving member and driven drum member coupled by a cable. The number of turns of the drum is determined by the length of the screw and is therefore very limited. There are also significant stresses on the cable as it moves between threads on the screw.

U.S. Pat. No. 5,562,556 to Carson provides a continuous cable rotary drive apparatus having a drum and a capstan with parallel axes of rotation and coupled by an endless or continuous cable that is tensioned by a tensioning device. The device is intended to enable continuous rotation of the capstan and drum in either direction. However, because the cable grooves on the drum and capstan are offset by half the separation of the grooves, the cable is subject to unwanted stresses and friction of the cable as the drum and capstan rotate and the cable slips and jumps out of the grooves on the drum and into the grooves on the capstan and vice versa.

German patent number DE10117077C1 discloses an assembly for clearing dung from an animal stall having a manure scraper which is moved to and fro by a continuous cable around deflection rollers, through a cable drive. In a first embodiment the cable is allowed to slip on the surface of a deflecting pulley, resulting in significant wear of it. In a second embodiment with multiple turns of the cable on the traction drum, the assembly includes grooved drive wheels angled to one another around which the cable is looped, reproducing in part a standard traction winch arrangement. The grooves guide the cable from one drive wheel to the other and ensure that the cable cannot escape from the drive wheels as it passes from one wheel onto the other. The presence of the grooves, which change the angle of the cable as it passes from one wheel onto the other, inevitably leads to rubbing of the cable and associated wear. Also in this second embodiment the assembly also might permit some movement of the cable across the surface of the drive wheels as they rotate resulting in cable wear.

SUMMARY OF THE PRESENT INVENTION

In the following description, the "flexible member" which may be guided by the apparatus of the invention is used to mean any member having sufficient flexibility for it to be capable of being wrapped around at least a portion of, and remain substantially in uniform contact with, a curved surface of a body such as a generally cylindrical drum or pulley. The flexible member may, for example, be a wire, rope, cable, chain, flat belt, toothed belt or v-shaped drive belt. Other suitable flexible means with which the invention may be used will be readily apparent to the skilled person.

When the or each flexible member is, for example, a wire, rope, cable, chain, flat belt, or v-shaped drive belt, by making use of friction between the flexible member and the one or more drums, the invention may be used for transferring energy between the or each flexible member and the or each drum. When the or each flexible member to be guided by the apparatus of the invention is a toothed belt or chain, positive drive between the flexible member and the or each drum and pulley may be used to transfer energy between the or each flexible member and the or each drum.

The terms "portion of wrap" and "wrap portion" are used interchangeably to mean the part of a turn or coil of a flexible member which may be guided by the apparatus of the invention that is in contact with the surface of the drum and/or the pulley. The length of the portion of wrap in contact with the drum or pulley surface will be governed by the dimensions of the drum and pulley.

The term "fixed diametrical plane" is used to mean a fixed position plane which is coincident with the plane of a cross-section of a body such as a drum or a pulley that is perpendicular to the longitudinal centreline and principle axis of rotation of the body. The fixed diametrical plane encompasses the cross-section of the body and extends radially beyond the outer surface of the body.

The terms "pulley" and "drum" are used in the following description to denote generally cylindrical bodies for guiding a flexible member, the "pulley" typically having a shorter axial dimension than the "drum". However, references to a "pulley" may alternatively be references to a further "drum". Alternatively, the pulley and or the drum may be arranged as two or more co-rotating pulleys or short drums, connected for simultaneous rotation by one or more smaller diameter or enlarged diameter connecting portions. Reduced diameter connecting portions advantageously reduce the weight of the or each drum and the associated material cost.

The present invention provides:
an apparatus for guiding a flexible member, the apparatus comprising:
  a drum mounted for rotation about a drum axis; and
  a pulley mounted for rotation about a pulley axis, the pulley axis being spaced from, and inclined to, the drum axis in an arrangement in which the shortest imaginary line extending between the drum and pulley axes is perpendicular to the axes of both the drum and pulley and lies substantially in a fixed diametrical plane of the pulley;
  the apparatus defining a path for the flexible member, the flexible member path including in sequence a first drum wrap portion around a first part of the drum circumference on a first fixed drum diametric plane perpendicular to the drum axis, a first connecting portion between the drum and the pulley, a pulley wrap portion around part of the pulley circumference on a fixed pulley diametric plane perpendicular to the pulley axis, a second connecting portion between the pulley and the drum and a second drum wrap portion around a second part of the drum circumference on a second fixed drum diametric plane perpendicular to the drum axis and axially spaced from the first drum diametric plane;
  the apparatus being arranged so that the first and second connecting portions lie on the respective first and second fixed drum diametric planes and the first and second connecting portions both lie on the fixed diametric plane of the pulley;
  wherein in use, as the drum and pulley rotate about the respective drum and pulley axes in contact with the flexible member, the relative arrangement of the drum and pulley is such that:
    the first and second drum portions of wrap remain substantially on the respective fixed, axially spaced first and second fixed diametric planes of the drum;
    the first and second connecting portions remain substantially on the respective first and second fixed diametric planes of the drum and the fixed diametric plane of the pulley; and
    the first pulley portion of wrap remains substantially on the fixed diametrical plane of the pulley.

The invention thereby provides a compact apparatus for guiding a flexible member which is capable of being used in a wide range of applications, including high tension applications involving heavy loads. The apparatus is particularly suitable for use as a traction winch as it is simpler, more durable and more compact than known traction winches.

The invention eliminates the need for superposition of portions of wrap of a flexible member on the drum surface and can be used with a flexible member of unlimited length or a looped, endless, continuous flexible member. It also substantially eliminates the need for deliberate or unwanted slippage of a flexible member along the surface of the drum that is typically associated with the operation of known winches. This reduces or substantially eliminates unwanted corrosion of the drum, damage to the flexible member caused by friction and tension on the flexible member as it passes around the drum. This is particularly advantageous for the wet environment in which wave power generators are required to operate and the part-wet, part-dry environment in which sailing winches, offshore power generation and deepwater marine systems, such as drilling and pipe-laying rigs are required to operate.

Unlike known winches in which a cable feeding device for changing the position of a cable relative to the drum surface is required to coil the cable in layers on the drum, as the drum and pulley of the apparatus of the invention rotate in use with the flexible member, the portions of wrap of flexible member are maintained at predetermined and fixed axial positions on the surfaces of the drum and pulley. This provides a compact apparatus in which the drum is not required to be of sufficient length to receive a large number of adjacent coils of cable and compensate for slippage or axial movement of the portions of wrap along the drum surface. The axial dimension of the drum is not therefore dependent on the length of flexible member required by a particular application.

The arrangement of the apparatus is such that in use, as the drum and pulley rotate in contact with the flexible member, the first and second drum portions of wrap remain substantially on the respective fixed, axially spaced first and second fixed diametric planes of the drum, and the first pulley portion of wrap remains substantially on the fixed diametrical plane of the pulley. This prevents the cable coming into contact with itself and thereby reduces friction and noise and improve the smoothness of operation of the apparatus. The arrangement is such that without any grooves or supporting channels in the surface of the drum and pulley for the flexible member or any other means for acting on the flexible member to guide it, the flexible member naturally remains on fixed diametrical planes of the drum and pulley as they rotate. The specific relative arrangement of the drum and pulley of the apparatus is what guides the flexible member and prevents it from moving along the surface of the drum and pulley.

The invention can be used, for example, in a wave power generation system to convert longitudinal motion of one or more flexible members attached to one or more buoyant members that move with sea waves into rotational motion of at least one drum to generate electricity. This facilitates the generation of electricity in response to the motion of sea waves.

The invention can also be used, for example, in a winch for winching a load connected to at least one end of a flexible member by rotational movement of at least one drum and/or at least one pulley. This provides a more compact winching device which does not suffer from the aforementioned problems of slippage of a flexible member on the drum or pulley surface and superposition of layers of a flexible member on top of one another.

Preferably the first and second connecting portions are parallel to one another in the fixed diametrical plane of the pulley.

Preferably the pulley wrap portion extends 180 degrees around the pulley circumference. Preferably at least one of the drum wrap portions also extends 180 degrees around the drum circumference.

Alternatively, at least one of the drum and pulley is grooved in the region of the drum and/or pulley portions of wrap of the flexible member or another flexible member retaining means is provided. This helps to prevent flattening of the flexible member which can deteriorate it, and helps to ensure that the first and second drum portions of wrap are maintained on the first and second fixed diametric planes of the drum even during phases of reduced or absent tension. Grooving of the surface of one or more of the drums ensures that the flexible member is maintained on fixed diametrical planes of the drum as the apparatus rotates with the flexible member even when the radius of the pulley relative to that of the drum is such that first and second connecting portions are not exactly parallel to one another in the fixed diametrical plane of the pulley. In the preferred embodiment in which the first and second connecting portions are parallel to one another in the fixed diametrical plane of the pulley, there is no need for grooving of the surface of the or each drum to prevent slippage as the drum portions of wrap are naturally maintained on axially spaced fixed diametrical planes of the drum.

Preferably the radius of the pulley is larger than the radius of the drum. Preferably the pulley axis is inclined relative to the drum axis for a given pulley radius such that the first and second connecting portions are positioned on the fixed diametrical plane of the pulley and parallel to one another in the fixed diametrical plane of the pulley. This provides an apparatus in which a flexible member is guided by the pulley and the drum with optimum smoothness and efficiency of operation as the tension on the flexible member acts perpendicularly to the axis of the pulley and drum and hence the tendency of the flexible member to slip along the surface of the drum and pulley is minimised or eliminated.

In another embodiment, the basic apparatus of the invention is replicated to provide at least two drums, each drum having an associated pulley, the drums and pulleys providing an apparatus for guiding a common flexible member along the flexible member path. Preferably a third connecting portion between one of the drum portions of wrap of the flexible member on the first drum and one of the drum portions of wrap of the flexible member on the second drum lies in the diametrical planes of the connected drum portions of wrap of the flexible member. The axes of the first and second pulleys can be tilted in the same or opposite directions relative to the corresponding first and second drums. In this embodiment, the flexible element may be used as a "transmission" mechanism for transferring force between the two drums. If, for example, the drums are provided with different radii, a speed reduction/amplification mechanism may also be provided.

In a further embodiment, the basic apparatus of the invention is replicated at spaced positions along the drum axis of a common drum. Preferably a first flexible member is guided on a first flexible member path which includes portions of wrap on the first pulley and the common drum and a second flexible member is guided along a second flexible member path which includes portions of wrap on the second pulley and the common drum. This embodiment may be used to transfer forces from one flexible member to another flexible member, using the drum as a force transmission mechanism. It may also be used to transfer forces from two flexible members to a single drum.

Preferably the pulleys are circumferentially spaced, more preferably evenly circumferentially spaced, from one another around the common drum, for example, diametrically opposite one another relative to the common drum when there are two pulleys or separated at equal angular intervals where there are more than two pulleys associated with the common drum. Preferably at least one of the first and second drum portions of wrap of the first flexible member path is interposed between the first and second drum portions of wrap of the second flexible member path. This arrangement ensures that the loading on the drum may be substantially or completely balanced to reduce or eliminate the bending moment on the drum support structure. The axes of the first and second pulleys may be tilted in the same or opposite directions relative to the drum.

In a further embodiment, one or more additional pulleys may be provided for the or each drum, each additional pulley defining a pair of axially spaced first and second drum portions of wrap on respective fixed diametrical planes of the associated drum. It has been found that by increasing the number of pulleys relative to each drum, it is possible to use the apparatus to transfer an increased force while limiting the tension imposed on the or each flexible member. Preferably the at least two pulleys associated with at least one drum are arranged so that they are tilted in the same direction and at the same angle relative to the axis of rotation of the associated drum, so that their respective pulley axes of rotation are parallel to and offset from one another. The flexible member path may include the first and second drum portions of wrap and pulley portion of wrap of at least two pulleys that are arranged for simultaneous rotation with a common flexible member.

At least two of the pulleys of any of the embodiments can have different radii to one another. This enables the dimension and the load rating of the apparatus to be tailored to the requirements of a particular application.

The angle of tilt of the, or each, pulley of any of the embodiments and the radius of the pulley relative to the radius of the corresponding drum are adjustable during setup of the apparatus so as to adjust the axial separation between the first and second drum portions of wrap associated with the flexible member path defined by the or each pulley. This can be used to control the required axial dimension of, and therefore the physical space required to accommodate, the or each drum.

The or each drum of any of the embodiments can have a reduced or increased diameter in the regions of the fixed diametrical planes of the or each drum on which the drum positions of wrap of the flexible member lie. This reduces the weight and material cost of the drums.

The invention has a wide range of applications. The invention is particularly suitable for example as a winch, such as a winch for use on a vehicle or sailboat or a winch for deep sea applications. An apparatus embodying the invention may also be used in any system designed to convert linear motion of a flexible member to rotational motion to drive a generator so as to generate electrical power.

The invention is also suitable for use in a wave power generation system such as that disclosed in PCT publication no. WO2008/065684 so as to convert generally longitudinal motion of one or more flexible members attached to one or more buoyant members that move with sea waves into rotational motion of the drum to generate electricity. An apparatus comprising two or more pulleys and a single drum is presently believed to be the most suitable for this application.

The invention could further be used to provide a continuous cable drive mechanism, a compact transmission device in a marine wave energy conversion system or an offshore or deep well winch having a higher load rating for use with very long runs of flexible member. The invention can also be used in applications using endless drive belts, for example cam belts and/or fan belts in vehicles as it permits the use of a lower tension belt that is cheaper, simpler and more durable than standard belts or chains and generates less friction.

BRIEF DESCRIPTION OF THE FIGURES

Example embodiments of the present invention will now be described with reference to the accompanying figures, in which.

DETAILED DESCRIPTION OF EXAMPLE EMBODIMENTS

Figure 1:
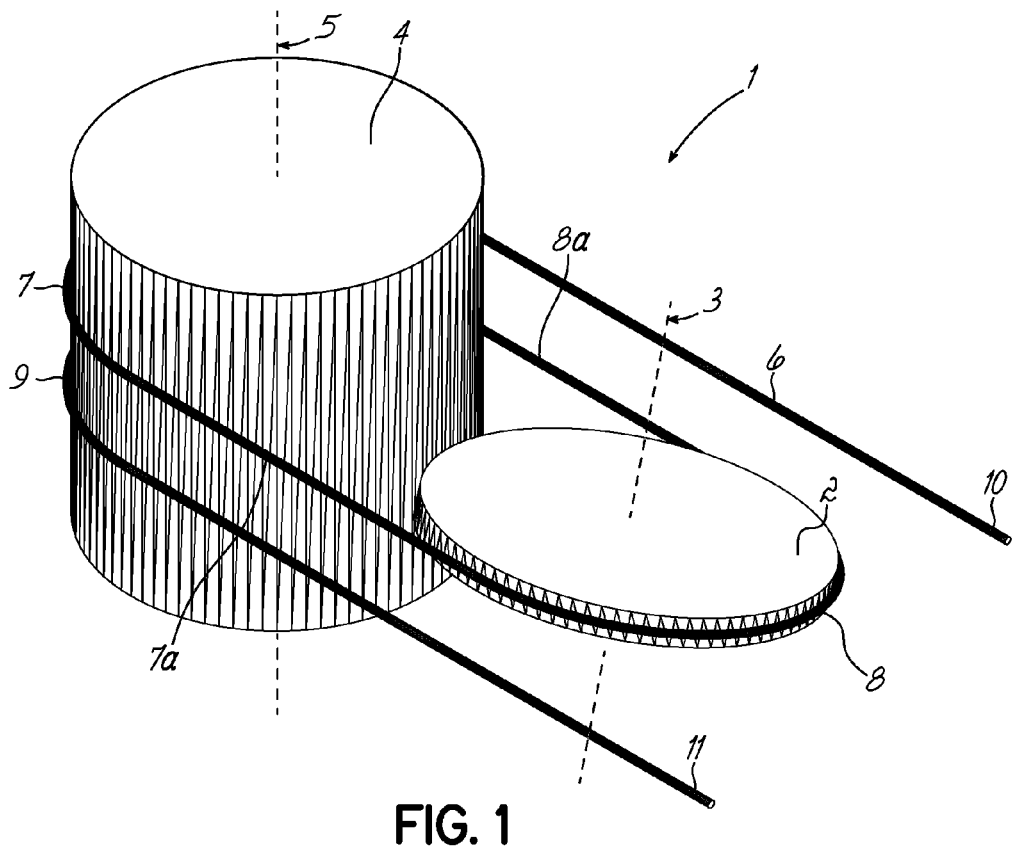
FIG. 1 is a perspective view of an apparatus according to a first embodiment of the present invention for guiding a flexible member.
Figure 2:
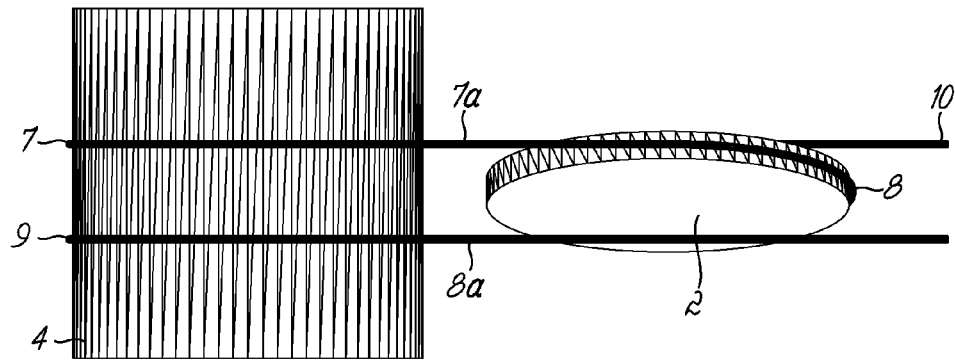
FIG. 2 is a side view of the apparatus of the first embodiment of FIG. 1.
Figure 3:
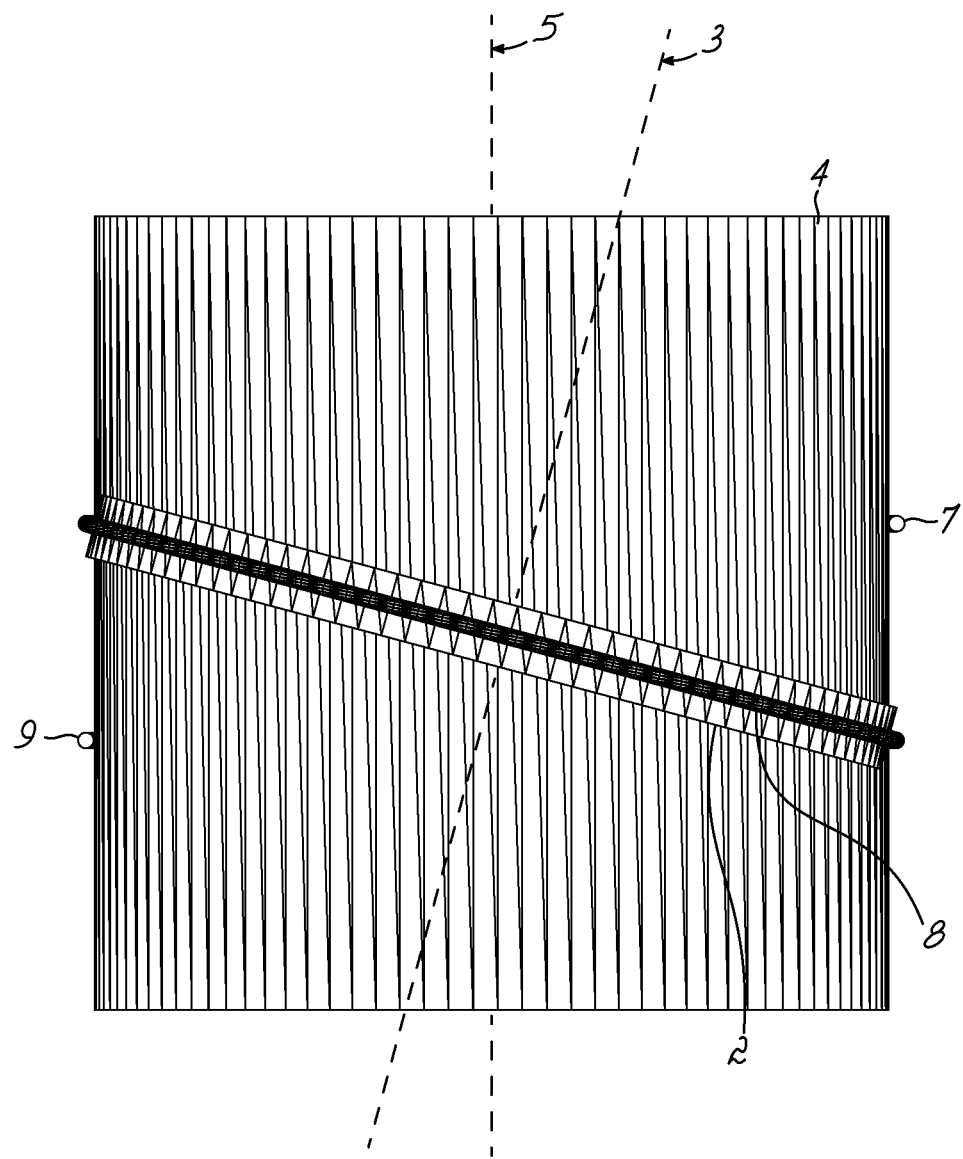
FIG. 3 is an end view of the apparatus of the first embodiment of FIGS. 1 and 2.

FIGS. 1 to 3 show an apparatus 1 according to a first embodiment for guiding a flexible member 6 onto a drum, the apparatus comprising a pulley 2 rotatable about a pulley axis of rotation 3 and a drum 4 rotatable about a drum axis of rotation 5. The pulley axis 3 is inclined at an acute angle relative to the drum axis 5.

The drum 4 is preferably an elongate cylindrical body. The drum may however be an alternative shape preferably having a curved outer surface. The drum may also be a component, for example an input or output shaft, of a mechanical drive apparatus. The pulley 2 is preferably a further cylindrical body having a shorter axial dimension than the drum. The pulley may however be an alternative shape such as a more elongate cylindrical body forming, for example another drum.

The pulley axis 3 is spaced from, and inclined to, the drum axis 5 in an arrangement in which the shortest imaginary line extending between the drum and pulley axes is perpendicular to the axes of both the drum and pulley and lies on a fixed diametrical plane of the pulley as best shown in FIG. 3. Alternatively, the shortest imaginary line extending between the drum and pulley axes may be perpendicular to the axes of both the drum and pulley and lie at a small angle to the fixed diametrical plane of the pulley.

The apparatus defines a flexible member path for a flexible member 6. The flexible member path includes, in sequence, a first wrap portion 7 around a first part of the drum circumference, a first connecting portion 7a between the drum 4 and the pulley 2, a pulley wrap portion 8 around part of the pulley circumference, a second connecting portion 8a between the pulley 2 and the drum 4 and a second wrap portion 9 around a second part of the drum circumference. The first 7 and second 9 drum wrap portions are positioned on predetermined, fixed and parallel diametric planes of the drum and are axially spaced from one another along the surface of the drum. Ends 10 and 11 of the flexible member extend outwardly from the surface of the drum 4 substantially on the fixed diametric planes of the first and second drum portions of wrap.

The apparatus is arranged so as to have one or more of the following features: the flexible member approaches the first drum wrap portion on the first fixed diametric plane of the drum and departs the second drum wrap portion on the second fixed diametric plane of the drum; the flexible member approaches the first drum wrap portion tangentially to the drum surface and departs the second drum wrap portion tangentially to the drum surface; the first and second connecting portions are tangential to the drum and pulley surfaces.

As shown in FIG. 1, the pulley wrap portion of the flexible member extends 180 degrees around the pulley circumference. One or both of the drum wrap portions of the flexible member may also extend 180 degrees around the drum circumference. Varying the angle of incidence of one or both ends of the flexible member relative to the drum will vary the length of one or both of the drum portions of wrap on the drum surface.

The fixed drum and pulley axes can be defined by any suitable supporting structure (not shown). The axes may be defined by a supporting structure that is common to the drum and pulley axes or by separate, individual supporting structures, allowing the apparatus to be tailored to the requirements of a particular application, such as the available space and the required load rating.

The common or individual supporting structures define a fixed angle of inclination between drum and pulley axes. The apparatus is arranged so that the first and second connecting portions lie on, or are inclined at a small angle relative to, the respective first and second fixed diametrical planes of the drum, so that in use of the apparatus, as the drum 4 and pulley 2 rotate in contact with the flexible member 6, the first and second drum portions of wrap 7, 9 are maintained on, or inclined at a small angle relative to, the respective fixed, axially spaced first and second fixed diametric planes of the drum, and the first pulley portion of wrap 8 is maintained on, or inclined at a small angle relative to the fixed diametrical plane of the pulley.

In operation of the apparatus, as end 10 of the flexible member is drawn away from the drum 4, friction between the first portion of wrap 7 and the drum causes the drum to rotate in a clockwise direction about the drum axis 5. This causes the flexible member to pass from the portion of wrap 8 on the pulley along the first connecting portion 7a onto the drum which causes the pulley 2 to rotate in a clockwise direction about the pulley axis 3. Rotation of the pulley 2 draws the flexible member 6 from the second portion of wrap 9 on the drum 4 along the second connecting portion 8a and onto the pulley 2, assisting with the clockwise rotation of the drum. The end 11 of the flexible member is progressively drawn along the flexible member path, thereby lengthening the end 10 of the flexible member and shortening the end 11 of the flexible member. Conversely, when the end 11 of the flexible member 6 is drawn away from the drum, the apparatus operates in reverse, thereby lengthening the end 11 and shortening the end 10 of the flexible member 6.

As the drum and pulley rotate about their respective axes in contact with the flexible member, the first 7 and second 9 drum portions of wrap are maintained on the predetermined, fixed, axially spaced diametric planes of the drum 4 and the first pulley portion of wrap 8 is maintained on the fixed diametrical plane of the pulley 2. The first 7a and second 8a connecting portions maintain a fixed angle of incidence with the drum and pulley surfaces and approach the drum and pulley surfaces tangentially and perpendicularly to the drum and pulley surfaces and on the fixed diametrical planes of the drum and pulley defined for the drum and pulley portions of wrap. Preferably the ends of 10 and 11 of the flexible member are also supported such that they maintain a fixed angle of incidence with the drum surface and approach and leave the surface of the drum tangentially and perpendicularly to the drum surfaces and on the fixed diametrical planes of the drum. The axial separation between the first and second drum portions of wrap on the surface of the drum (see FIG. 2) prevents frictional contact between, and associated damage to, the drum portions of wrap of the flexible member and the first and second connecting portions.

As shown in FIG. 3, when the apparatus is viewed from the end, the pulley axis is inclined relative to the drum axis and the pulley has a larger radius than the drum such that the inclined pulley spans the diameter of the drum, and the first and second connecting portions coupled to the ends of the pulley portion of wrap of the flexible member path, are positioned on diametrically opposite sides of the drum. When the apparatus is viewed from above, the first and second connecting portions of the flexible member path are parallel to one another in the fixed diametrical plane of the pulley. In this configuration, the flexible member is naturally guided around the drum surface such that the first and second drum portions of wrap are automatically maintained on fixed axial position diametrical planes of the drum. The tendency for the flexible member to slip on the drum and pulley surface is therefore substantially eliminated.

The inclination of the pulley axis 3 relative to the drum axis 5 and the size of the radius of the pulley relative to that of the drum are simultaneously adjustable so as to adjust the axial separation of the first 7 and second 9 drum portions of wrap of the flexible member whilst ensuring that the first and second connecting portions of the flexible member path are parallel to one another in the fixed diametrical plane of the pulley when the apparatus is viewed from above. An increase in the inclination of the pulley axis relative to the drum axis together with a corresponding increase in the radius of the pulley relative to that of the drum increases the axial separation of the first and second drum portions of wrap on the surface of the drum and thereby increases the required axial length of the drum to accommodate the first and second drum portions of wrap. Conversely, a reduction in the inclination of the pulley axis relative to the drum axis and an associated reduction in the pulley radius relative to that of the drum leads to a reduction in the axial separation of the first and second drum portions of wrap and the required axial length of the drum to accommodate the first and second drum portions of wrap. The axial separation between the first and second drum portion of wraps is therefore adjustable during design and setup of the apparatus so as to control the required axial length of the drum for a given application.

The drum 4 and/or the pulley 2 may be circumferentially grooved so that the first and second drum portions of wraps and/or the first pulley portion of wrap are received in grooves or channels 12 in the surface of the drum and/or pulley. As the portions of wrap retain fixed axial positions on the drum and pulley, the portion of wraps will remain seated in their respective grooves as the drum and pulley rotate in contact with the flexible member. The provision of grooves has advantages for flexible members having a curved outer surface, such as wires or cables, and is particularly advantageous for stiffer, high tension wires or cables. The need for grooves is reduced or eliminated where the apparatus is to be used to guide a flexible member in the form of a flat belt. The drum and/or pulley may alternatively be provided with a flexible member guide or retaining means which may, for example, be formed as a slot or channel in a cover in which the drum or pulley rotates to prevent the flexible member from moving along or sliding off the outer surface of the drum or pulley.

Figure 2A:
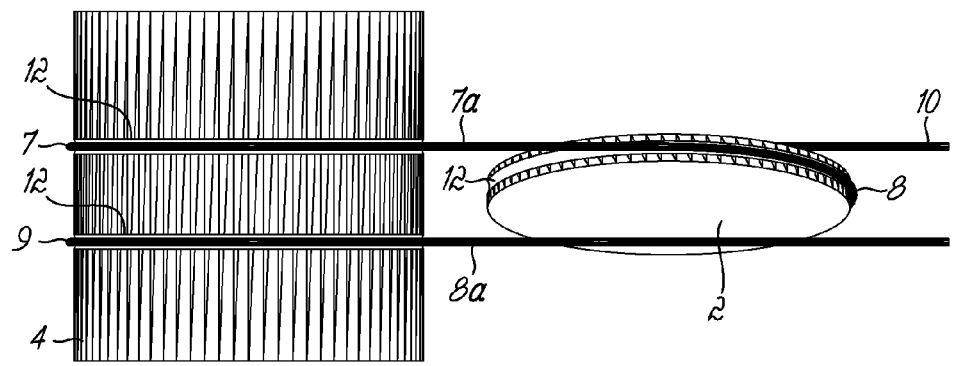
FIG. 2A is a side view of the apparatus similar to the first embodiment of FIG. 1, further having a flexible member retaining means.

As shown in FIG. 2A, the circumferential groove 12 in the surface of the drum and/or pulley is of particular importance where the apparatus is arranged to define a flexible member path in which either of the first or second connecting portions 7a or 8a or either end of the flexible member 10, 11 does not lie exactly on the fixed diametrical planes of the drum or pulley portions of wrap but is inclined at a small angle relative to the fixed diametrical planes.

In an alternative configuration, the supporting structure defines a fixed drum axis but the pulley axis is not fixed relative to the drum so that the pulley is substantially completely free to rotate with the flexible member and is not constrained to rotate about an axis having a fixed angle of inclination relative to the drum axis. The pulley can accordingly adjust its diametrical plane as it rotates with the flexible member so that the first and second connecting portions of the flexible member path are maintained on the fixed diametrical plane of the pulley.

In further alternative configurations, the supporting structure defines a fixed angle of inclination between the drum and pulley axes and the pulley axis is inclined to the drum axis as shown in FIG. 3, however the radius of the pulley relative to that of the drum is such that when the apparatus is viewed from the end as shown in FIG. 3, the pulley either extends on the diametrical plane of the pulley beyond the diametrically opposite sides of the drum or stops short of the diametrical opposite sides of the drum. When the apparatus is viewed from above, the first and second connecting portions of the flexible member path are consequently no longer parallel in the fixed diametrical plane of the pulley. Instead, where the pulley extends beyond the diametrically opposite sides of the drum when viewed from the side, the first and second connecting portions of the flexible member path when the apparatus is viewed from above converge in the fixed diametrical plane of the pulley from the drum towards the pulley. Conversely, where the pulley stops short of the diametrically opposite sides of the drum when viewed from the side, the first and second connecting portions of the flexible member path when the apparatus is viewed from above diverge in the fixed diametrical plane of the pulley from the drum towards the pulley. In either of these alternative configurations, the pulley should be grooved so as to retain the pulley portion of wrap and prevent the pulley portion of wrap from slipping across the surface of the pulley. The required depth of the groove will vary according to a number of factors, such as the dimension of the flexible member, the relative inclination of the drum and pulley axes and the relative difference between the radii of the drum and pulley.

Figure 4:
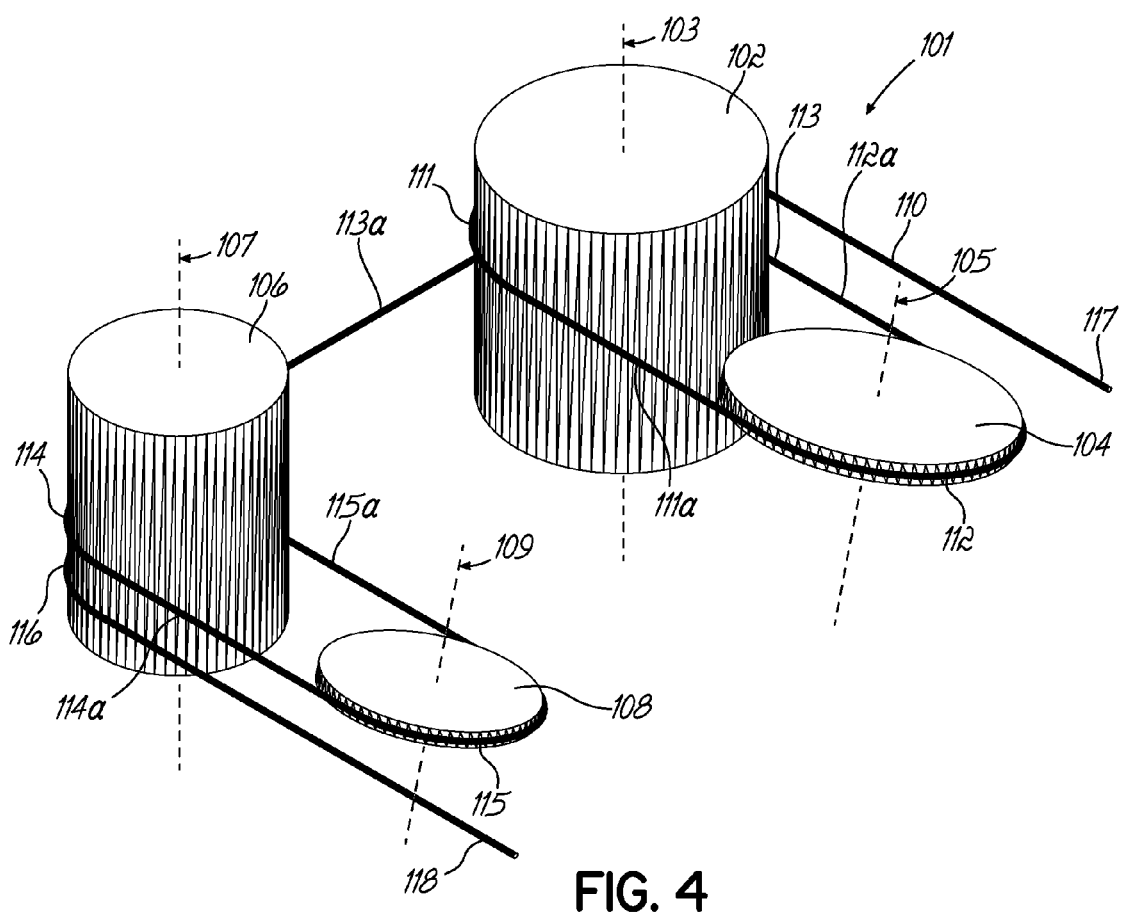
FIG. 4 is a perspective view of an apparatus according to a second embodiment of the present invention for guiding a flexible member.
Figure 5:
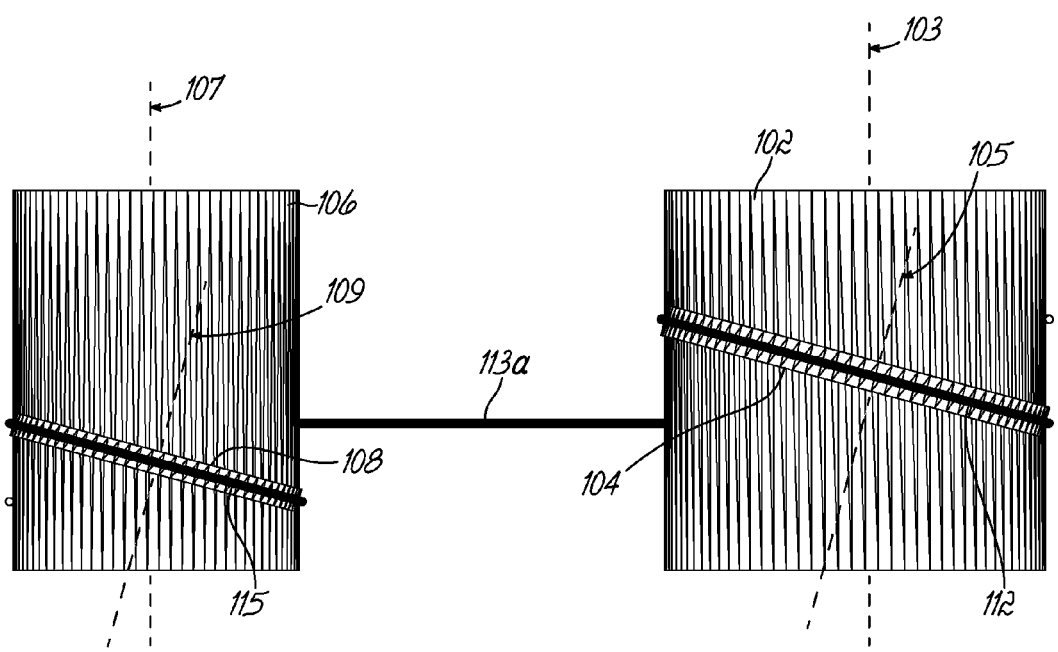
FIG. 5 is a side view of the apparatus of the second embodiment of FIG. 4.

FIGS. 4 and 5 show an apparatus 101 according to a second example embodiment for guiding a flexible member in which the apparatus 1 of the first embodiment is replicated and arranged for rotation with a common flexible member. The apparatus 101 comprises a first drum 102 rotatable about a first drum axis 103, a first pulley 104 rotatable about a first pulley axis 105, a second drum 106 rotatable about a second drum axis 107 and a second pulley 108 rotatable about a second pulley axis 109. The drums and pulleys are coupled for rotation with a common flexible member 110. The pulleys may be supported relative to the respective drums in the manner described in relation to the apparatus 1 of the first embodiments. The pulley axes 105 and 109 are therefore inclined relative the respective drum axes 103 and 107.

A flexible member path consists of, in sequence, a first drum portion of wrap 111 on the first drum, a first connecting portion 111a, a first pulley portion of wrap 112 on the first pulley, a second connecting portion 112a, a second drum portion of wrap 113 on the first drum, a third connecting portion 113a, a first drum portion of wrap 114 on the second drum, a fourth connecting portion 114a, a first pulley portion of wrap 115 on the second pulley, a fifth connecting portion 115a and a second drum portion of wrap 116 on the second drum. The flexible member has ends 117 and 118.

In operation, when the end 117 of flexible member 110 is drawn away from the first drum 102, the arrangement of the portions of wrap on the drums and associated pulleys and the friction or a positive drive between the chosen flexible member and drums and pulleys causes the drums and pulleys to rotate simultaneously in a clockwise direction in a similar manner to that described in relation to the apparatus 1 of the first embodiment, leading to a lengthening of the end 117 and a shortening of the end 118 of the flexible member 110. Alternatively, when the end 118 of the flexible member 110 is drawn away from the second drum 106, the system works in reverse thereby lengthening the end 118 and shortening the end 117 of the flexible member 110.

The first 104 and second 108 pulleys are shown in FIG. 5 as being inclined in the same direction, and at approximately the same angle to, the respective first 102 and second 106 drums with which the pulleys are associated. However, the pulleys 104, 108 may alternatively both be inclined in the opposite direction to the respective first and second drums to that shown or may be inclined in opposite directions to one another. The first 104 and second 108 pulleys are also shown as having different radii and are associated with respective first and second drums also having different radii. The apparatus may alternatively include first and second pulleys of equal radius and/or first and second drums of equal radius.

The third connecting portion 113a is shown in FIG. 5 as connecting the second drum portion of wrap 113 on the first drum 102 with the first a drum portion of wrap 114 on the second drum 106. It will be readily appreciated that the third connecting portion 113a may alternatively connect either of the first or second drum portions of wrap on the first drum with either of the first or second drum portions of wrap on the second drum. It will also be appreciated that the first and second drums 102, 106 are interchangeable such that either of the drums is the first drum to rotate in contact with the flexible member.

It will be readily appreciated that unless superseded by the above discussion relating to the apparatus 101 of the second embodiment, the discussion relating to the apparatus 1 of the first embodiment and its various alternative configurations also applies to the apparatus 101 of this second embodiment or any of its individual drums or pulleys, as appropriate.

Figure 6:
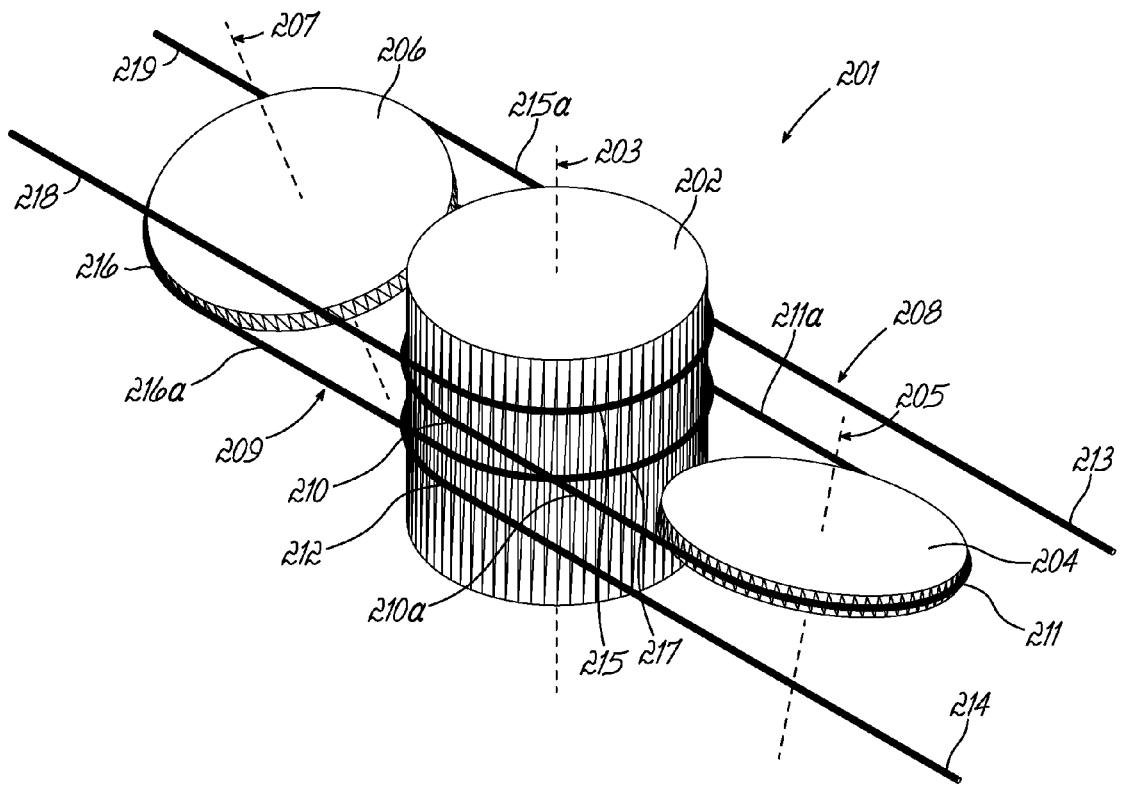
FIG. 6 is a perspective view of an apparatus according to a third embodiment of the present invention for guiding a flexible member.
Figure 7:
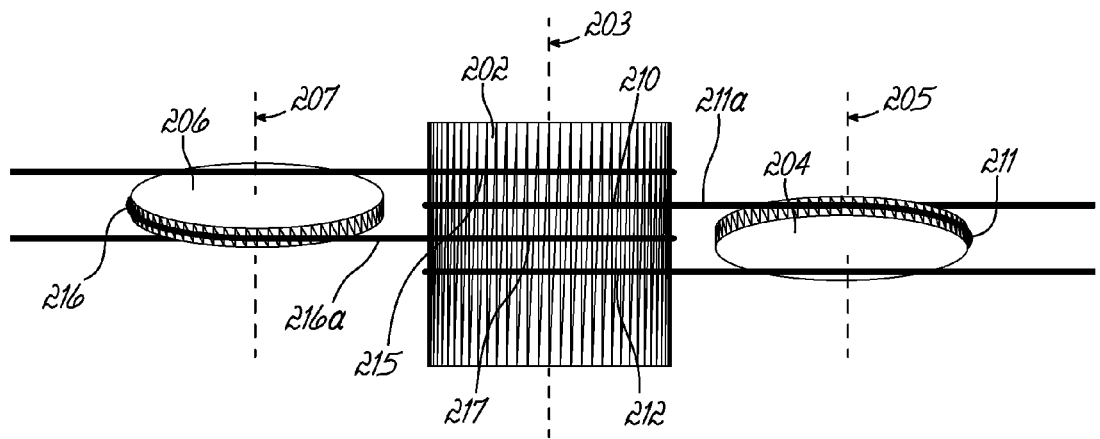
FIG. 7 is a side view of the apparatus of the third embodiment of FIG. 6.

FIGS. 6 and 7 show an apparatus 201 according to a third example embodiment for guiding a flexible member, in which the apparatus 1 of the first embodiment is replicated and the apparatuses are associated with a common drum, each apparatus arranged for rotation with a separate flexible member. The apparatus 201 comprises a drum 202 rotatable about a first axis 203, a first pulley 204 rotatable about a first pulley axis 205 and a second pulley 206 rotatable about a second pulley axis 207. The drum 202 and first pulley 204 are arranged for rotation with a first flexible member 208. The drum 202 and second pulley 206 are arranged for rotation with a second flexible member 209. The first and second pulleys may be supported relative to the drum in the manner described in relation to the apparatus 1 of the first embodiment so that the pulley axes 205 and 207 are inclined to the drum axis 203. A11-12

A first flexible member path consists of, in sequence, a first drum portion of wrap 210 on the drum, a first connecting portion 210a, a first pulley portion of wrap 211 on the first pulley, a second connecting portion 211a and a second drum portion of wrap 212 on the drum. The first flexible member has ends 213 and 214. A second flexible member path consists of, in sequence, a first drum portion of wrap 215 on the drum, a first connecting portion 215a, a first pulley portion of wrap 216 on the second pulley, a second connecting portion 216a and a second drum portion of wrap 217. The second flexible member has ends 218 and 219.

In operation, when the end 213 of the first flexible member 208 is drawn away from the drum 202, the arrangement of the portions of wrap on the drum 202 and the pulleys 204, 206 and the friction or positive drive between the flexible members 208, 209 and the drum 202 and pulleys 204, 206 causes the drum and first pulley 204 to rotate simultaneously in a clockwise direction in a similar manner to that described in relation to the apparatuses 1 and 101 of the first and second embodiments, leading to a lengthening of the end 213 and a shortening of the end 214 of the first flexible member 208. Rotation of the drum also causes the second pulley 206 to rotate in the same direction as the drum and first pulley, thereby lengthening the end 218 and shortening the end 219 of the second flexible member 209. Alternatively, when the end 214 of the first flexible member 208 is drawn away from the drum 202, the system works in reverse, thereby lengthening the end 214 and shortening the end 213 of the first flexible member 208 and lengthening the end 219 and shortening the end 218 of the second flexible member 209.

The axis of rotation 205 of first pulley 204 relative to the drum 202 is shown in FIG. 6 as being inclined in the opposite direction to the axis of rotation 207 of the second pulley 206 by approximately an equal angle. While this is configuration not essential, it has the advantage that the first and second drum portions of wrap 210, 212 of the first flexible member 208 are axially spaced on the surface of the drum 202 from the first and second drum portions of wrap 215, 217 of the second flexible member 209, with the second drum portion of wrap 217 of the second flexible member 209 being interposed between the first 210 and second 212 drum portions of wrap of the first flexible member 208. The axial spacing of the pairs of drum wraps on the surface of the drum 202 prevents the portions of wrap of the first and second flexible members from coming into contact with each other, leading to smoother operation of the apparatus and reduced frictional wear of the first and second flexible members. It also minimises the axial length of the drum that is required to accommodate the drum portions of wrap associated with the first and second flexible members, allowing a more compact apparatus for space critical applications.

Interposing at least one of the drum wrap portions of one of the flexible members between the drum wrap portions of the other flexible member means that the load on the first and second flexible members acts in opposite directions about the drum axis 203, whereby the resultant bending moment on the support structure defining the drum axis is reduced or eliminated compared to apparatuses 1 and 101 of the first and second embodiments. This is particularly advantageous for high load applications and permits the use of a simpler and lighter drum support structure. It may even be possible to dispense with the drum support structure altogether if any bending moment about the drum axis is substantially eliminated.

This advantage of reducing or eliminating the bending moment on the drum support can alternatively be achieved by interposing the other of the drum portions of wrap of the first flexible member between the first and second drum portions of wrap of the second flexible member, or by interposing both the first and second drum portions of wrap of one of the flexible members between first and second drum portions of wrap of the other of the flexible members.

The apparatus 201 may alternatively be configured such that the first 204 and second 206 pulleys are axially offset relative to the surface of the drum in order that the first and second drum portions of wrap of one of the flexible member paths is adjacent to, rather than interposed between, the first and second drum portions of wrap of the other flexible member path. This may reduce the resultant bending moment on the drum support structure supporting compared to apparatuses 1 and 101, but is likely to require a drum having a correspondingly greater axial length.

The first and second pulley axes 205, 207 may alternatively be inclined relative to the drum axis at different angles from one another so that the first and second drum portions of wrap of one flexible member are axially spaced on the surface of the drum by a different amount to the axial spacing of the first and second drum portions of wrap of the other flexible member. The first 204 and second 206 pulleys may also have different radii from one another.

It will be readily appreciated that unless superseded by the above discussion relating to the apparatus 201 of the third embodiment, the discussion relating to the apparatuses 1 and 101 of the first and second embodiments and their various alternative configurations also applies to the apparatus 201 of this third embodiment or any of its individual drums or pulleys, as appropriate.

Figure 8:
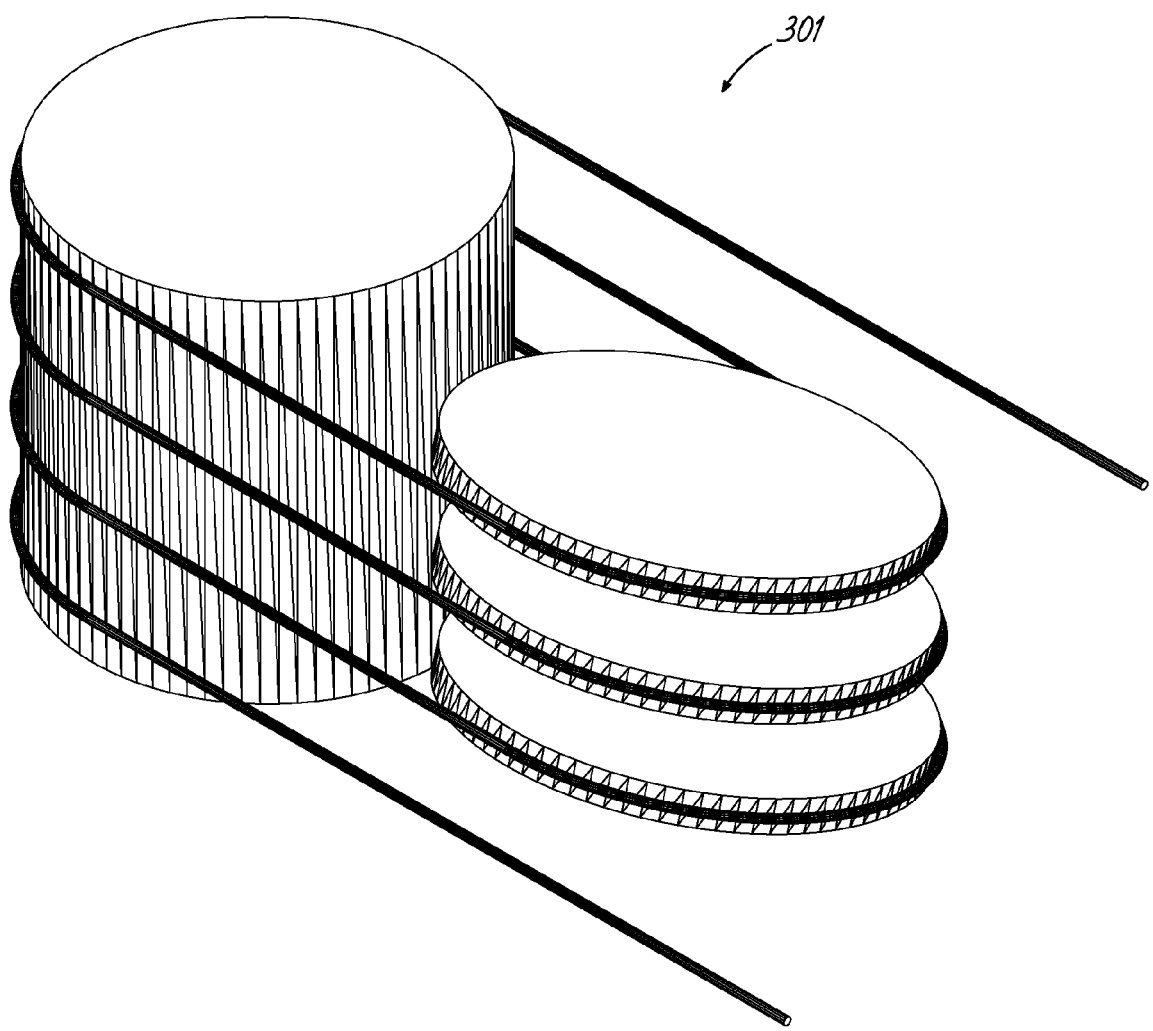
FIG. 8 is a perspective view of an apparatus according to a fourth embodiment of the present invention for guiding a flexible member.
Figure 9:
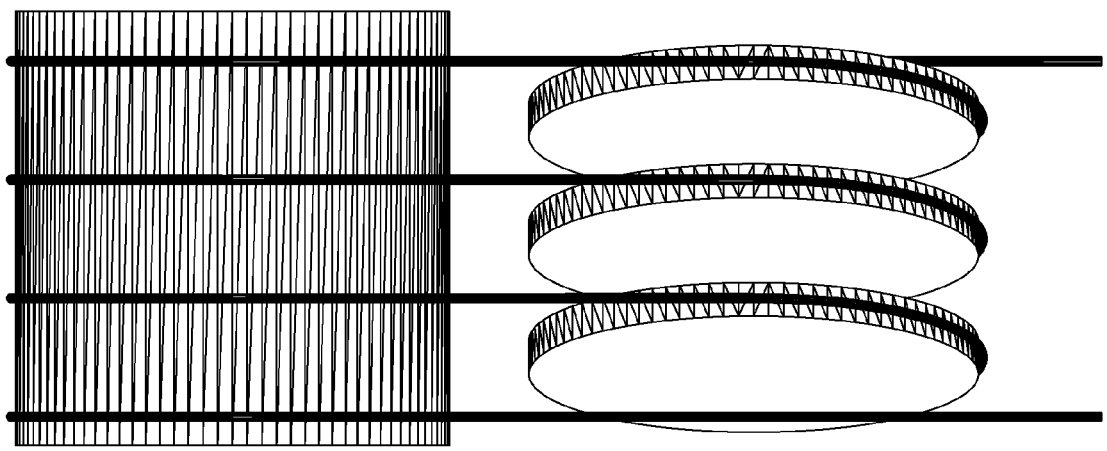
FIG. 9 is a side view of the apparatus of the fourth embodiment of FIG. 8.
Figure 10:
FIG. 10 is an end view of the apparatus of the fourth embodiment of FIGS. 8 and 9.

FIGS. 8 to 10 show an apparatus 301 according to a fourth embodiment of the invention in which one or more additional pulleys may be associated with any drum, each additional pulley adding a further pair of drum portions of wrap on fixed axial diametrical positions on the drum. Each of the pulleys is inclined relative to the corresponding drum so that in use of the apparatus, the pair of drum portions of wrap associated with each pulley remain on different pairs of fixed, axially spaced diametrical planes of the drum and the pulley portion of wrap and the first and second connecting portions of the flexible member path associated with each pulley remain on a fixed diametrical plane of that pulley.

The pulleys may be arranged in a stacked configuration adjacent to one or more of the drums. The pulleys may be arranged so that the pairs of first and second drum portions of wrap associated with each pulley are adjacent one another on the drum surface or interposed between one another so as to control the required axial length of the drum to accommodate the drum portions of wrap. The pulleys or stacks of pulleys may alternatively be circumferentially spaced from one another around the drum so as to minimise or eliminate the resultant bending moment on the support structure for the or each drum.

It will be readily appreciated that unless superseded by the above discussion relating to the apparatus 301 of the fourth embodiment, the discussion relating to the apparatuses 1 and 101 of the first and second embodiments and their various alternative configurations also applies to the apparatus 301 of this fourth embodiment or any of its individual drums or pulleys, as appropriate.

Although FIGS. 8 to 10 relating to the fourth embodiment show a number of pulleys associated with only a single drum, it will readily be appreciated that one or more additional pulleys may be associated with any number of the drums of any of the previous embodiments and alternative configurations.

The apparatus of any of the preceding embodiments preferably has a means for maintaining tension on the, or each, flexible member, which may for example be a counter weight or a resiliently deformable element such as a spring. Alternatively, the line may close on itself to form a continuous, endless loop so that the flexible member tensions itself.

Where required, and particularly where any of the example apparatuses is used with a long length of flexible member, such as in offshore marine applications, one or more spools (not shown) may be provided as supply and take up stores for the or each flexible member and to provide continuous tension on the flexible member.

Any of the apparatuses of the foregoing example embodiments is variable to tailor it to the requirements (available space, load rating, etc.) of a particular application. A multitude of other apparatuses and configurations may therefore be provided by replicating any of the components of the basic apparatus of the first embodiment. The main variables enabling the provision of an apparatus suitable for a particular application are: the number of drums; the number of pulleys relative to each drum; the inclination of the or each pulley axis relative to its respective drum, the relative sizes of the or each drum and the or each associated pulley and the number of flexible members coupling the various drums and pulleys for rotation. The materials of the drum, pulley and the flexible member and the associated material properties, particularly the coefficient of friction between the flexible member and the drum and pulley, can also selected so as to vary the load rating of the apparatus and tailor it to a dry, wet or part wet/part dry environment. Other variables will be readily apparent to the skilled person.

The invention claimed is:

1. An apparatus for guiding a flexible member, the apparatus comprising:
   a drum mounted for rotation about a drum axis; and
   a first pulley mounted for rotation about a first pulley axis, the first pulley axis being spaced from and inclined relative to the drum axis in an arrangement in which the shortest imaginary line extending between the drum axis and the first pulley axis is perpendicular to each of the drum axis and the first pulley axis and lies substantially in a fixed first pulley diametric plane;
   wherein the apparatus defines a path for the flexible member, the flexible member path including in sequence a first drum wrap portion around a first part of the drum circumference on a first fixed drum diametric plane perpendicular to the drum axis, a first connecting portion between the drum and the first pulley, a pulley wrap portion around part of the first pulley circumference on the fixed first pulley diametric plane perpendicular to the first pulley axis, a second connecting portion between the first pulley and the drum, and a second drum wrap portion around a second part of the drum circumference on a second fixed drum diametric plane perpendicular to the drum axis and axially spaced from the first fixed drum diametric plane;

wherein the apparatus is arranged so that the first and second connecting portions lie on the respective first and second fixed drum diametric planes and the first and second connecting portions both lie on the fixed first pulley diametric plane;

wherein in use, as the drum and first pulley rotate about the respective drum and first pulley axes in contact with the flexible member, the relative arrangement of the drum and first pulley is such that the first and second drum wrap portions remain substantially on a respective fixed, axially spaced first and second fixed drum diametric planes, the first and second connecting portions remain substantially on the respective first and second fixed drum diametric planes and the fixed first pulley diametric plane, and the pulley wrap portion remains substantially on the fixed first pulley diametric plane.

2. The apparatus of claim 1, wherein the first and second connecting portions are generally parallel to one another in the fixed first pulley diametric plane.

3. The apparatus of claim 1, wherein the first pulley wrap portion extends 180 degrees around the first pulley circumference.

4. The apparatus of claim 1, further comprising a flexible member retaining means.

5. The apparatus of claim 4, wherein the flexible member retaining means comprises a groove in at least one of the drum and the first pulley at a respective drum or pulley wrap portion.

6. The apparatus of claim 1, wherein the radius of the first pulley is larger than the radius of the drum.

7. The apparatus of claims 1, further comprising:
a second pulley mounted for rotation about a second pulley axis, the second pulley axis being spaced from and inclined relative to the drum axis in an arrangement in which the shortest imaginary line extending between the drum axis and the second pulley axis is perpendicular to each of the drum axis and the second pulley axis and lies substantially in a fixed second pulley diametric plane,
wherein the first and second pulleys are spaced along the drum axis.

8. The apparatus of claim 7, wherein each of the first and second pulleys is arranged so that the pulleys are tilted in the same direction and at the same angle relative to the axis of rotation of the drum and so that the first and second pulley axes of rotation are parallel to and offset from one another.

9. The apparatus of claim 8, further comprising a third pulley mounted for rotation about a third pulley axis,
wherein each of the first, second, and third pulleys is arranged so that the pulleys are tilted in the same direction and at the same angle relative to the axis of rotation of the drum and so that the first, second, and third pulley axes of rotation are parallel to and offset from one another.

10. The apparatus of claim 7, wherein the path for the flexible member further includes a third drum wrap portion around a third part of the drum circumference on a third fixed drum diametric plane perpendicular to the drum axis, a pulley wrap portion around part of the second pulley circumference on the fixed second pulley diametric plane perpendicular to the second pulley axis, and a fourth drum wrap portion around a fourth part of the drum circumference on a fourth fixed drum diametric plane perpendicular to the drum axis and axially spaced from the third fixed drum diametric plane.

11. The apparatus of claim 7, wherein the apparatus further defines a second path for a second flexible member, the second flexible member path includes in sequence a third drum wrap portion around a third part of the drum circumference on a third fixed drum diametric plane perpendicular to the drum axis, a pulley wrap portion around part of the second pulley circumference on the fixed second pulley diametric plane perpendicular to the second pulley axis, and a fourth drum wrap portion around a fourth part of the drum circumference on a fourth fixed drum diametric plane perpendicular to the drum axis and axially spaced from the third fixed drum diametric plane.

12. The apparatus of claim 11, wherein the first and second pulleys are circumferentially spaced from one another around the drum.

13. The apparatus of claim 11, wherein at least one of the first and second drum wrap portions of the flexible member path is interposed between the third and fourth drum wrap portions of the second flexible member path.

14. The apparatus of claims 11, wherein the first and second pulley axes are tilted in opposite directions relative to the drum.

15. A wave power generation system comprising the apparatus claim 1, wherein the system is configured to convert longitudinal motion of the flexible member attached to one or more buoyant members that move with sea waves into rotational motion of the drum to generate electricity.

16. A winch comprising the apparatus of claim 1, wherein the winch is configured to winch a load connected to at least one end of the flexible member by rotational movement of at least one of the drum and the first pulley.

17. A system for guiding a flexible member, the system comprising:
a first apparatus further comprising:
a first drum mounted for rotation about a first drum axis; and
a first pulley mounted for rotation about a first pulley axis being spaced from and inclined relative to the first drum axis in an arrangement in which the shortest imaginary line extending between the first drum axis and the first pulley axis is perpendicular to each of the drum axis and the first pulley axis and lies substantially in a fixed first pulley diametric plane;
wherein the first apparatus defines a first portion of a path for the flexible member, the first portion of the flexible member path including in sequence a first drum wrap portion around a first part of the first drum circumference on a first fixed drum diametric plane perpendicular to the first drum axis, a first connecting portion between the first drum and the first pulley, a pulley wrap portion around part of the first pulley circumference on the fixed first pulley diametric plane and perpendicular to the first pulley axis, a second connecting portion between the first pulley and the first drum, and a second drum wrap portion around a second part of the first drum circumference on a second fixed drum diametric plane perpendicular to the first drum axis and axially spaced from the first fixed drum diametric plane;
a second apparatus further comprising:
a second drum mounted for rotation about a second drum axis; and a second pulley mounted for rotation about a second pulley axis being spaced from and inclined relative to the second drum axis in an arrangement in which the shortest imaginary line extending between the second drum axis and the second pulley axis is perpendicular to each of the drum axis and the second pulley axis and lies substantially in a fixed second pulley diametric plane;

wherein the second apparatus defines a second portion of the path for the flexible member, the second portion of the flexible member path including in sequence a first drum wrap portion around a first part of the second drum circumference on a first fixed drum diametric plane perpendicular to the first drum axis, a fourth connecting portion between the second drum and the second pulley, a pulley wrap portion around part of the second pulley circumference on the fixed second pulley diametric plane and perpendicular to the second pulley axis, a fifth connecting portion between the second pulley and the second drum, and a second drum wrap portion around a second part of the second drum circumference on a second fixed drum diametric plane perpendicular to the second drum axis and axially spaced from the first fixed drum diametric plane; and a third connecting portion between one of the first and second drum wrap portions of the first drum and one of the first and second drum wrap portions of the second drum.

18. The apparatus of claim 17, wherein the axes of the first and second pulleys are tilted in the same direction relative to the respective first and second drums.

19. The apparatus of claims 17, wherein the first and second pulleys have different radii.

* * * * *